Oct. 16, 1956  R. H. KIMBALL  2,767,224
HEXACHLOROCYCLOHEXANE ISOMER SEPARATION
Filed Jan. 23, 1951  2 Sheets-Sheet 1
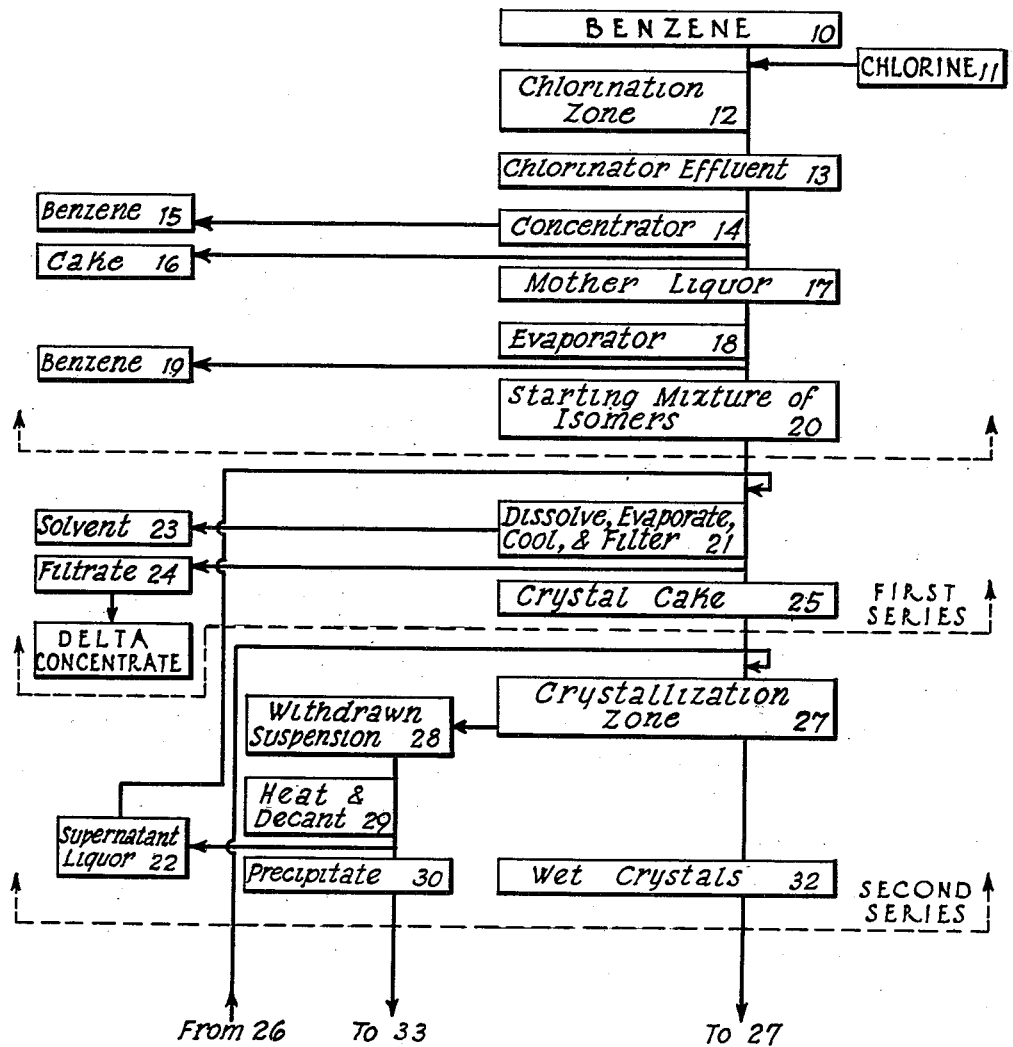
RICHARD H. KIMBALL
INVENTOR.
BY Dean Laurence

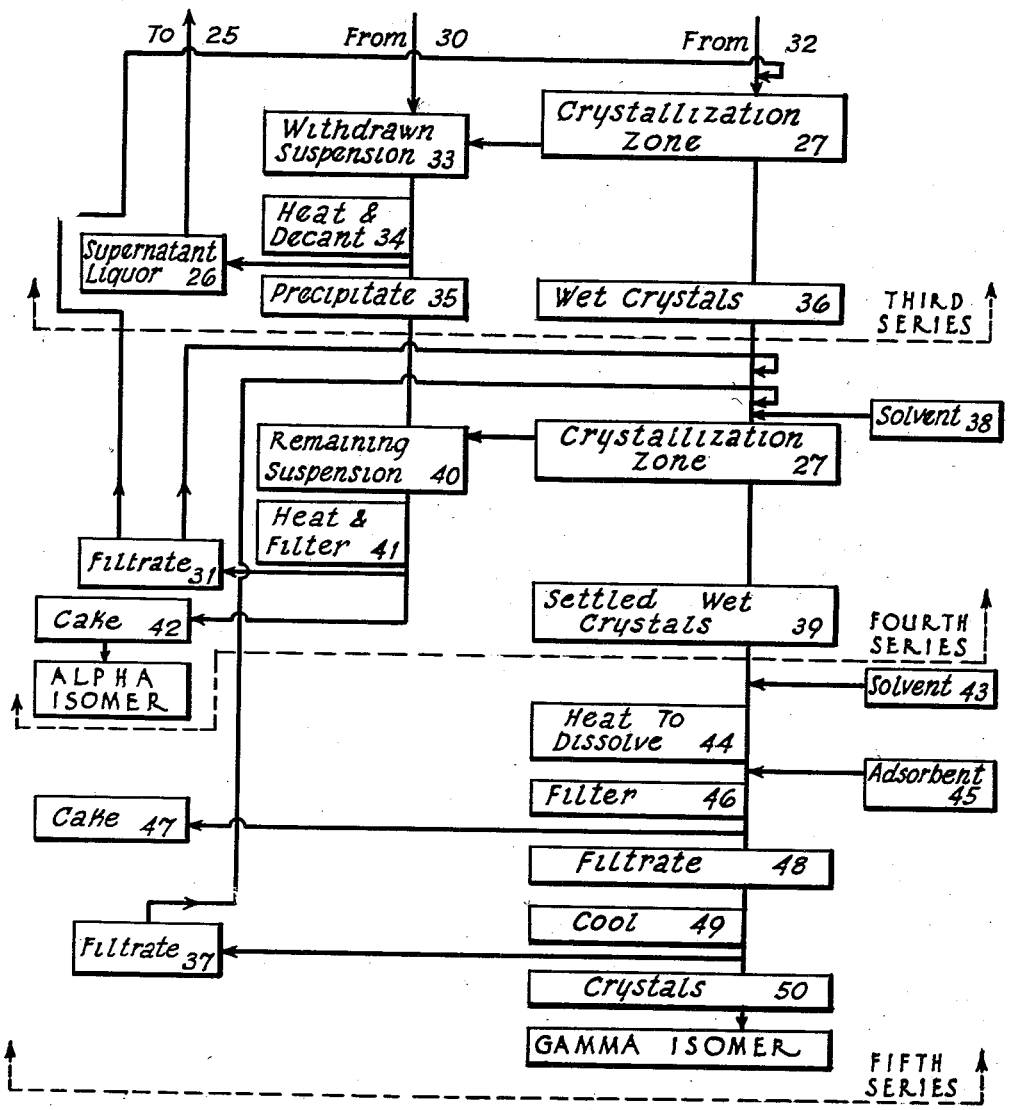

United States Patent Office 2,767,224
Patented Oct. 16, 1956

2,767,224

HEXACHLOROCYCLOHEXANE ISOMER SEPARATION

Richard H. Kimball, Lewiston, N. Y., assignor to Hooker Electrochemical Company, Niagara Falls, N. Y., a corporation of New York Application January 23, 1951, Serial No. 207,375

3 Claims. (Cl. 260—648)

This invention relates to a process for separating mixtures of isomers of benzene hexachloride, with particular reference to the gamma isomer, using a fluid classification technique and involving the partial re-cycling of materials.

1,2,3,4,5,6-hexachlorocyclohexane, as a mixture of stereoisomers, usually called "benzene hexachloride," is useful as an insecticide. It has been found that only one of the five known spatial isomers of the compound is usefully active as an insecticide. An article in Canadian Chemical Process Industries, January 1946, page 58, states the relative insecticidal activity of the various isomers is as follows:

| Compound | Relative Am't by Wt. to Kill 50% of Pests in 5 Days |
| --- | --- |
| alpha benzene hexachloride | 900. |
| beta benzene hexachloride | almost non-toxic. |
| gamma benzene hexachloride | 1. |
| delta benzene hexachloride | 5,500. |

It is apparent that substantially pure gamma isomer would be desirable for use as an active component of various insecticidal mixtures, in preference to using a mixture of the various isomers. It has also been found that the characteristically offensive odor and residual taste usually associated with mixtures of isomers of benzene hexachloride are substantially eliminated when a pure gamma isomer is provided.

A manner for synthesizing the gamma isomer without the simultaneous production of at least four other isomers has not yet been reported in the literature. However, various methods of synthesizing mixtures of the isomers by the actinic chlorination of benzene has been reported, see, for example, United States Patents 2,010,841, 2,218,148, 2,499,120 and British Patents 447,058 and 405,569. These methods produce mixtures of the isomers in the following percentages:

| Isomer: | Percent |
| --- | --- |
| Alpha | 60 to 75 |
| Beta | 5 to 12 |
| Gamma | 8 to 16 |
| Delta | 5 to 12 |
| Epsilon | 1 to 3 |
| Heptachlor and other impurities | 0 to 5 |

Many methods for enhancing the gamma isomer content of mixtures as described above have been reported in the literature, all of which are dependent on solvent extraction procedures. These processes suffer from at least one of two inherent difficulties: (1) they are incapable of producing a pure gamma isomer; or, (2) in the enhancement and separation steps, an excessive amount of the gamma isomer is unrecoverably lost.

It is, therefore, a primary object of the present invention to provide a commercially satisfactory process for the separation of mixtures of benzene hexachloride isomers. It is a further object to provide such a process which yields a high proportion of the gamma isomer originally present in a chlorination product as a material containing 99 percent or higher gamma isomer. A particular object of the present invention is to provide a process for the separation of a pure gamma isomer of benzene hexachloride involving a fluid-classification and recycling technique. Other objects will become apparent hereinafter.

It has now been found that, by dissolving a mixture of isomers of benzene hexachloride in an organic solvent and crystallizing a mixture of isomers from the solution, it is possible to separate the mixture of crystals by fluid classification to effect a substantially complete separation of the impurity isomers from the gamma isomer. By a critical sequence of operations involving solvents, suspensions, and precipitates, based on the above finding, it is possible, not only to separate a pure gamma isomer from the mixture, but also to avoid the unrecoverable loss of over about 15 or 20 percent of the gamma isomer present in the starting mixture of isomers. This is accomplished according to the hereinafter described process.

The invention, then includes more particularly the steps and series of related steps involved in a general separation cycle maintained in equilibrium and into which there is introduced a starting mixture of benzene hexachloride isomers. For convenience in description, the separation cycle may be divided into five series of related steps wherein the feed for each series is derived from the preceding series and at least a portion of a liquor or filtrate from each series of steps is fed back to at least one preceding series of steps. Also, in order to render this description more readily understandable, the general separation cycle will be referred to as being made up of a group of interrelated concentration cycles in which each isomer may be considered as being concentrated. Thus, reference will be made herein to an alpha concentration cycle, a delta concentration cycle and a gamma concentration cycle.

The primary purpose of the first series of related steps is the elimination from the starting mixture of isomers of substantially all of the beta, delta, and epsilon isomer and some of the alpha isomer therein present. The primary purpose of the second, third, and fourth series of related steps is the progressive enhancement of the gamma isomer content of the mixture of benzene hexachloride isomers undergoing treatment, while avoiding unrecoverable loss of any of the gamma isomer; and, in the fourth series of steps to separate the remaining alpha isomer content. The primary purpose of the fifth step is the finishing of the gamma isomer, as by decolorization, et cetera, whereby a product of exceptional purity is obtained.

Reference is made to the annexed drawing, which is a diagrammatic representation of a process whereby a mixture of benzene hexachloride isomers may be produced and pure gamma isomer may be isolated therefrom.

Referring now to said drawing: benzene 10 and chlorine 11, in a mole ratio of at least about three moles of benzene per mole of chlorine, are cocurrently contacted in a suitable chlorination zone 12 in the presence of actinic radiation until a portion of the benzene has been converted to benzene hexachloride. The chlorinator effluent 13 is concentrated 14 by removal of benzene 15, with simultaneous separation of a considerable proportion of the alpha and beta isomers as solids, up to the point where the liquid phase is nearly saturated with the gamma isomer. The solids thus obtained, containing substantially only alpha and beta isomers, and preferably substantially no gamma isomer, are then removed by centrifugation, decantation, or filtration and the cake 16 thereafter discarded, while the resulting mother liquor 17 is evaporated 18 to remove the remaining benzene 19. A mixture of benzene hexachloride isomers 20 is thus obtained which may contain about 23 percent alpha isomer, about 45 percent gamma isomer, about 25 percent delta isomer, and about 7 percent beta and epsilon isomers. Other manners, such as those which employ solvent extraction, super-saturation, et cetera, for preparing a mixture of benzene hexachloride isomers, may be used to obtain starting materials for the countercurrent fluid classification process to be hereinafter described. However, I have found the above process to be suitable for the production of such a composition.

It should be here mentioned that the flow sheet and the general separation cycle as hereinafter described will be considered to be completely in equilibrium. It will be apparent from the description hereinafter to one skilled in the art as to how to start and build up to a state of equilibrium, in which the starting materials are introduced into the general separation cycle at substantially the same rate at which the products are removed from it.

The starting mixture of isomers 20 is dissolved 21 in a supernatant liquor 22, obtained from a subsequent step of the cycle, and solvent 23 is removed by evaporation in an amount such that, when the mixture is cooled to a previously-determined crystallization temperature, an amount of beta, delta, and epsilon isomer equal to that introduced into the system from the starting mixture of isomers, will, upon filtration of the suspension, remain in solution and be removed from the system in the filtrate 24, which is a concentrate of delta, beta and epsilon isomers. It is important that this particular step be carefully controlled, since this step of the process is the only one in which any significant amount of gamma isomer is removed from the equilibrium cycle other than as product. The cake 25 of crystals from the preceding suspension is then mixed with a supernatant liquor 26, obtained from a subsequent step of the process, in a crystallization zone 27 and the mixture heated to insure complete solution of all of the solids. When complete solution has been attained, the solution is cooled, with agitation, until the desired degree of crystallization is obtained. The suspension is held for a suitable period at the desired temperature with continued agitation, during which period a portion of the crystals in the suspension settle therein, and a portion 28 of the suspension is withdrawn without withdrawing settled crystals in the crystallization zone 27. The portion of the suspension remaining in the crystallization zone 27 will hereinafter be referred to as the "wet crystals."

The withdrawn suspension 28, constituting the starting material of the alpha isomer concentration cycle, is heated 29 to a temperature several centigrade degrees above that temperature at which it was withdrawn and then allowed to settle at this temperature. The supernatant liquor 22 is decanted 29, leaving a precipitate 30, and is used to dissolve the starting mixture of isomers 20 introduced into the system.

Sufficient filtrate 31, from a subsequent step in the process, to dissolve all of the wet crystals 32 remaining in the crystallization zone 27 at an elevated temperature is added thereto and the mixture heated. The resulting solution is cooled, with agitation, until substantial crystallization has occurred. The agitation is maintained for a suitable period of time, during which some of the crystals settle and a portion 33 of the suspension is withdrawn without withdrawing the settled wet crystals. The precipitate 30 from the preceding classification step is added to the withdrawn suspension 33 and this mixture heated 34 several centigrade degrees above that temperature at which the suspension 33 was withdrawn from the crystallization zone 27. The heated suspension 33 is allowed to settle and decanted 34 to obtain a precipitate 35 and a supernatant liquor 26 which is used to dissolve the crystal cake 25 from the initial series of separation steps.

The remainder of the filtrate 31 from a subsequent step in the cycle, all of a filtrate 37 from a still further separation step in the cycle, and organic solvent 38 are added to the wet crystals 36 remaining in the crystallization zone 27 from the preceding fluid classification step. Thereafter, the mixture is heated to dissolve the crystals therein, the solution is cooled, with agitation, and a portion of the crystals settled. The settled wet crystals 39 are withdrawn from the classification zone 27 and the remaining suspension 40 is withdrawn.

To this suspension 40 is added the precipitate 35 from the preceding series of steps and the mixture heated 41 and filtered 41. The filter cake 42 is discarded and the filtrate 31 is used as hereinbefore described.

The settled wet crystals 39 from the preceding classification step, to which organic solvent 43 has been added in an amount such that complete solution of the crystals will be attained at an elevated temperature 44, is treated with adsorbents 45 in an amount sufficient to purify the solution. The mixture is filtered 46 at a temperature at least above that at which initial nucleation of any isomer occurs, and the resulting absorbent cake 47 is discarded. The filtrate 48 is cooled 49 to induce crystallization and the resulting suspension filtered to remove the crystals. The filtrate 37 is used as hereinbefore described in the cycle and the crystals 50, after drying, are the substantially pure gamma isomer of benzene hexachloride.

It will be apparent from the drawing and the foregoing description thereof that certain inter-related concentration cycles are established and maintained in the system when it is at equilibrium. Thus, an alpha isomer concentration cycle is established by the introduction of the crystal cake 25 into the supernatant liquor 26 from a subsequent step in the cycle, which alpha cycle includes the various steps through the heating and decanting 29 of the first withdrawn suspension 28 from the crystallization zone 27 through the return of a portion of the last filtrate 31 to the crystallization zone 27, along with make-up solvent 38, and the discharge of the alpha cake 42 from the equilibrium system.

Referring now to the preceding general description of the process, the manner of obtaining a starting mixture of benzene hexachloride isomers containing alpha isomer and gamma isomer is not critical. Thus, technical benzene hexachloride made by any of the methods of the prior art may be subjected to solvent extraction in such a manner as to dissolve substantially all of the gamma isomer but to leave behind the greater part of the alpha or the alpha and beta isomers. The resulting solution may be concentrated by removal of part of the solvent and the concentrated solution so-obtained may be used as the starting mixture for the countercurrent cyclic separation process of the invention. Alternatively, the solvent may be completely removed and the resulting mixture of isomers may be used in the solid state, or in the molten condition, or in suspension in a solvent as the said starting mixture. Another variation involves crystallizing alpha or alpha and beta isomer from a solution containing gamma isomer, with the subsequent separation of solids from the solution, or other procedures may be employed.

However, a particularly applicable procedure is to contact benzene and chlorine cocurrently in the presence of actinic light as described in Patent 2,499,120 to convert up to 10 percent of the benzene to benzene hexachloride. From the resulting solution or suspension of benzene hexachloride benzene is evaporated, advantageously under reduced pressure, until a substantial proportion of the alpha and beta isomers have separated as crystals, and the liquid phase is nearly saturated with the gamma isomer, but no gamma isomer has yet crystallized out. The mother liquor is then separated from the crystals of alpha and beta by appropriate means such as centrifuging, and the crystals are advantageously washed with benzene to free them from adhering gamma. The remaining benzene may be evaporated from the mother liquor, and the residual solids which are greatly enhanced in gamma content compared to the benzene hexachloride present in the original chlorinator effluent may be used as the starting material for the cyclic countercurrent separation process. Having a low melting point, the solids may advantageously be introduced into said process in a molten condition, or as a solution in any other solvent. Such a solution may be prepared directly from the benzene solution left from the separation of alpha and beta isomers, by simultaneously introducing into said benzene solution a lower aliphatic alcohol, such as methanol, while distilling off a binary mixture of methanol and benzene, until the benzene is substantially removed. The remaining methanol solution of the solids enhanced in gamma content can be introduced directly into the cyclic separation process. Other methods of producing suitable mixtures of isomers enhanced in gamma content over technical benzene hexachloride will be apparent to those skilled in the art.

With more particular reference to the fluid classification procedure involving a countercurrent flow of materials which forms the subject matter of my invention, the starting mixture of isomers obtained as aforesaid are then introduced into a general separation cycle maintained in equilibrium.

THE FIRST SERIES OF STEPS

The first series of related steps in the separation cycle has for its primary purpose the removal from the equilibrium system of the same quantity of the delta and epsilon isomers as is present in the starting mixture of isomers introduced into the system and some or all of the beta isomer so introduced. It is also desired to accomplish this end with the aid of a liquor having some gamma isomer content which would otherwise be unrecoverable.

The said first series of related steps includes: putting the starting mixture of benzene hexachloride isomers into a supernatant liquor obtained from the second series of steps in the process; heating the suspension, with agitation, to cause all of the solids to go into solution; partially evaporating solvent from the said solution; cooling the solution to cause crystallization of the portion of the isomers in the starting mixture; and, filtering the suspension of crystals so-obtained to separate a crystal cake for introduction into the second series of steps of the process, and a filtrate which is removed from the separation cycle.

The supernatant liquor obtained from a later step in the process is composed of any suitable organic solvent having dissolved therein various ratios of isomers. The ratio of isomers must, however, be such that the crystal cake resulting from the first series of steps has a suitable ratio of gamma to alpha isomer for satisfactory results from use in the subsequent series of fluid classification and other steps. When starting the process for the first time, organic solvent containing no isomers can be used satisfactorily in lieu of the said supernatant liquor. The starting mixture of isomers in the supernatant liquor is then heated to a temperature sufficient to dissolve any crystals present. Solution of the said suspension is aided by agitation, as with a propeller-type stirrer operating at moderate speeds. Heating is continued at the boiling point of the solution to evaporate solvent therefrom until the concentration of solids in the solution is such that, upon subsequent cooling to the chosen temperature of crystallization, the liquid phase is substantially saturated with the delta isomer, but little or no delta isomer crystallizes out with the gamma isomer.

After the desired amount of solvent as aforesaid has been evaporated, the solution is cooled to effect crystallization of as much of the gamma isomer as possible without causing the retention in the crystal cake of more delta and epsilon isomers than was present in the supernatant liquor used to dissolve the starting mixture of benzene hexachloride isomers. Generally, a temperature in the range between about zero degrees and about twenty degrees centigrade is used, and, preferably a temperature of about ten degrees centigrade. When conducted in this manner, this step results in the delta and epsilon isomers in the starting mixture of benzene hexachloride isomers remaining in solution and provides for the partial recovery of gamma isomer from that portion of the circulating fluid classifying medium used to dissolve the said starting mixture of isomers.

The cooled suspension from the preceding step is then filtered. The filtrate, containing that amount of delta and epsilon isomers present in the starting mixture of benzene hexachloride isomers, together with minor amounts of alpha, beta and gamma isomers, is removed from the fluid classification cycle. This filtrate may be worked up to yield trichlorobenzene by a hydrolysis procedure or it may be employed as a source of pure delta isomer, with accompanying partial recovery of its gamma isomer content. The filter cake is used as a feed for the second series of steps in the separation cycle.

THE SECOND SERIES OF STEPS

The primary purpose of the second series of related steps in the separation cycle is to treat the crystal cake from the first said series of steps in a manner such that a product enhanced in gamma content with relation to the proportion of other isomers therein is obtained as a feed for subsequent operations, without permitting the unrecoverable loss of any gamma isomer from the separation cycle. Another purpose to be accomplished in conducting the said second series of related steps is the initiation of a secondary concentration cycle which will ultimately yield substantially pure alpha isomer, or alpha and beta isomer, which may be removed from the general equilibrium system or separation cycle.

The second series of related steps includes: adding to the said crystal cake from the said first series of related steps a supernatant liquor obtained from the third series of steps in the general cycle or process; heating the suspension, with agitation, to cause all the solids to go into solution; cooling the solution to cause crystallization of a mixture of isomers from solution, while agitating the suspension; withdrawing a portion of the suspension from the zone of crystallization; heating the withdrawn portion of the suspension sufficiently to cause partial or complete solution of any gamma isomer crystals therein; decanting the said heated withdrawn portion of the suspension after settling; recycling the supernatant liquor to the said first series of related steps for use as a solvent to dissolve the starting mixture of benzene hexachloride isomers introduced into the separation cycle; adding the precipitate from the said decantation to the withdrawn portion of suspension of crystals in the third series of related steps; and, employing the wet crystals as the starting material in conducting the third series of steps next to be described.

The said supernatant liquor obtained from the third series of steps of the process and used for dissolving the crystal cake from the said first series of steps has a higher proportion of gamma isomer in relation to the individual amounts of other isomers therein present than does the supernatant liquor obtained in the second series of related steps and used for dissolving the starting mixture of benzene hexachloride isomers introduced into the separation cycle. The proportion of delta isomer in relation to the other isomers present in the supernatant liquor introduced from the third series of steps into the second series of steps is reduced as compared with the proportion of the same isomer in the supernatant liquor obtained in the second series of steps and used for dissolving the starting mixture of benzene hexachloride isomers introduced into the separation cycle. The supernatant liquor from the said third series of steps is generally at a temperature in the range of about 10 degrees and about 50 degrees centigrade, preferably about thirty degrees centigrade, when it is added to the crystal cake from the said first series of related steps. The combination of crystal cake from the first series of related steps, and the supernatant liquor from the third series of related steps, will hereinafter be referred to as the "charge for the crystallization zone" of the second series of steps, and in similar manner for the third and fourth series of related steps.

The charge for the crystallization zone of the second series of related steps is heated to a temperature between about 50 degrees and about 65 degrees centigrade, preferably about 60 degrees centigrade, at least sufficiently elevated to dissolve completely all of the crystals in the said supernatant liquor. The solution so-formed is then cooled to a temperature in the range of about zero degrees to about 20 degrees centigrade, preferably about ten degrees centigrade, resulting in a suspension of crystals in a solution.

The quantity of the suspension so-produced which is withdrawn from the zone of crystallization is preferably about 60 to 80 percent of the total volume of the suspension. The withdrawn portion of the suspension is heated several centigrade degrees above that temperature at which it was withdrawn, for example, about five to 50 centigrade degrees, to increase the amount of dissolved gamma isomer, the hot suspension settled and the supernatant liquor decanted and used in the first series of steps. The precipitate from the decantation step is added to the portion of suspension of crystals withdrawn from the zone of crystallization in the third series of related steps.

THE THIRD SERIES OF STEPS

The third series of related steps constitutes substantially a repetition of the second series of related steps above-described, and includes: adding to the wet crystals resulting from the second series of related steps a portion of a filtrate obtained from the fourth series of related steps, to produce the charge for the crystallization zone; heating the suspension with agitation to cause all of the solids to go into solution; cooling the solution to cause crystallization of a mixture of isomers from solution, while agitating the suspension; withdrawing a portion of the suspension from the zone of crystallization; adding to said withdrawn portion the precipitate from the decantation of the withdrawn portion of suspension of crystals in the second series of related steps; heating the mixture sufficiently to cause partial or complete solution of any gamma isomer crystals therein; decanting the said heated mixture after settling; recycling the supernatant liquor to the said second series of related steps for use as a solvent to dissolve the crystal cake resulting from the first series of related steps; adding the precipitate from the said decantation to the remaining suspension obtained from the zone of crystallization in the fourth series of related steps; and, using the wet crystals remaining in the zone of crystallization at the end of the third series of related steps as the starting material in the fourth series of steps.

The portion of the filtrate obtained from the fourth series of steps of the cycle and used for dissolving the wet crystals from the said second series of steps has a higher proportion of gamma isomer and a lower proportion of delta isomer in relation to the individual amounts of other isomers therein present than does the supernatant liquor obtained from the third series of steps and used for dissolving the crystal cake of enhanced gamma content entering the second series of steps.

The mixture of the wet crystals from the second series of steps and the filtrate recycled from the fourth series of steps constitutes the charge for the crystallization zone of the third series of related steps. The ratio of the total gamma isomer to the total alpha isomer present in the said charge for the third series of steps is higher than the corresponding ratio of total gamma to total alpha isomer in the charge for the second series of steps.

The charge for the crystallization zone of the third series of related steps is heated with agitation, preferably until substantially all of the suspended crystals have dissolved. The solution so-formed is cooled with agitation to a temperature in the range of about zero degrees to about twenty degrees centigrade, so that a mixture of crystals results having varying sizes susceptible to fluid classification.

The fluid classification may be accomplished by maintaining the temperature of crystallization and the agitation, while decanting off about 60 to 80 percent by volume of the suspension, at such a rate that the finer crystals of solid alpha or alpha and beta isomers tend to remain in suspension and be removed with the portion of the suspension which is decanted off, while the coarser granular crystals of the gamma isomer tend to sink to the bottom of the kettle or crystallization zone, and to be held in the portion of the suspension which remains in the zone of crystallization. As a result of this fluid classification process, the portion of suspended crystals remaining in the zone of crystallization has a higher ratio of gamma to alpha isomer, and the portion of suspended crystals removed with the suspension which was decanted from the zone of crystallization has a lower ratio of gamma to alpha isomer, than the ratio of gamma to alpha isomer in the suspended crystals in the said zone of crystallization before decantation.

In the foregoing series of related steps, the portion of suspension withdrawn from the crystallization zone of the second series of related steps, contains a lower ratio of total gamma to total alpha isomer on a dry basis, than the corresponding ratio of total gamma to total alpha isomer on a dry basis in the portion of suspension withdrawn from the crystallization zone of the third series of related steps.

THE FOURTH SERIES OF STEPS

The fourth series of related steps includes: adding solvent from outside the general cycle to the wet crystals of enhanced gamma to alpha ratio obtained in carrying out the third series of related steps, together with a portion of the filtrate obtained after crystallization and filtration in said fourth series of steps, and the filtrate obtained in the fifth series of related steps; heating the so-formed suspension to dissolve substantially all of the crystals in the mixture of liquids; cooling the solution to precipitate a mixture of crystals of benzene hexachloride isomers while agitating; withdrawing from the zone of crystallization while agitating a settled wet crystal portion of the suspension in which the crystals contain a higher ratio of gamma to alpha isomer then the ratio of gamma to alpha isomer in the suspended crystals remaining in the zone of crystallization; withdrawing the remainder of the suspension from the zone of crystallization; combining said suspension with precipitate formed in the third series of steps, heating the said combination of withdrawn remainder of the suspension and precipitate sufficiently to cause solution of any gamma crystals therein; filtering the heated suspension; removing the filter cake of alpha isomer or alpha and beta isomer from the cycle; returning a portion of the filtrate to the said third series of related steps for addition to the wet crystals constituting the starting feed for the said third series of related steps; and, as aforesaid, using a portion of the said filtrate for dissolving the wet crystals constituting the feed for the fourth series of related steps.

The ratio of the total gamma isomer to the total alpha isomer present in the charge for the crystallization zone of the fourth series of related steps, is higher than the corresponding ratio of total gamma to total alpha isomer in the charge for the third series of related steps.

The heating of the suspension to dissolve the crystals of enhanced gamma content, the cooling of the solution with agitation to precipitate a mixture of crystals of enhanced gamma content are conducted in a manner similar to that described in the preceding series of related steps.

In this fourth series of related steps, the portion of the settled wet crystals withdrawn from the zone of crystallization contains a higher ratio of gamma to alpha isomer, and the crystals remaining in the zone of crystallization contain a lower ratio of gamma to alpha isomer, than the ratio of gamma to alpha isomer in the mixture of isomer crystals in the zone before the separation. The remainder of the suspension withdrawn from the zone of crystallization is combined with precipitate resulting from the third series of steps and the mixture heated and filtered. However, the filtrate obtained from this latter suspension is not completely returned to the said third series of steps, but is divided and about one quarter of it is recycled within the fourth series of steps and the remaining three quarters recycled for use in dissolving the wet crystals constituting the feed for the said third series of steps. In this fourth series of related steps, a substantially pure alpha isomer of benzene hexachloride, or a mixture of substantially pure alpha and beta isomers is obtained as the filter cake from the filtration of the remaining suspension removed from the zone of crystallization and is removed from the alpha concentration cycle.

It is to be noted that the proportion of alpha isomer progressively increases in each of the precipitates or filter cake from the suspensions withdrawn from the zones of crystallization during the course of the alpha isomer concentration cycle.

THE FIFTH SERIES OF STEPS

The fifth series of related steps includes: adding solvent from outside the cycle to the wet crystals of enhanced gamma content obtained in carrying out the said fourth series of related steps; heating the suspension to cause solution of the crystals in the solvent; adding activated carbon or other adsorbents to the solution to purify the same; filtering the adsorbent from the heated solution; removing the adsorbent cake from the system; cooling the filtrate to crystallize a major proportion of the gamma isomer therefrom; filtering out the gamma crystals so produced; recycling the filtrate to the fourth series of related steps for use in dissolving the wet crystal feed thereto; drying the gamma isomer crystals and removing the same from the separation cycle.

In conducting the above described series of related steps, it will be noted that the quantity of delta isomer is at a maximum in the portion of circulating liquor used for dissolving the starting mixture of isomers in the first series of related steps, and that the quantity of delta isomer declines in the portion of circulating liquor introduced into each successive step. The epsilon isomer, being present in such small amount that it is usually unsaturated in the various circulating liquors, in general follows the distribution of the delta isomer in the general countercurrent cyclic process at equilibrium. The same is true of any minor quantities of colored impurities, or of substitution products which may have formed during the chlorination of benzene to benzene hexachloride. It will be noted that substantially all of the above delta and epsilon isomers and minor impurities introduced into the first series of related steps, with the starting mixture of benzene hexachloride isomers, leaves the general purification system in the filtrate which is separated from the crystal cake to be introduced into the second series of related steps. If the quantity of beta isomer in the starting mixture of isomers introduced into the first series of related steps is small, it will not reach saturation in the various circulating liquors, and its distribution throughout the countercurrent purification system will follow that of the delta and epsilon, and it will all leave the system in the same filtrate as do these isomers. However, if the amount of beta exceeds that which can be held in solution, the excess of beta will be separated and eliminated from the system with the excess of alpha as a filter cake resulting from the fourth series of related steps.

In the cyclic countercurrent purification system at equilibrium all filtrates except that recycled from the fifth series of related steps are saturated or even supersaturated with the alpha isomer. Some of this alpha isomer leaves the system along with the delta and epsilon isomers dissolved in the filtrate separated in the first series of related steps from the crystal cake to be introduced into the second series of related steps. The major portion of the alpha isomer however is removed as a suspension in the second, third and fourth series of related steps, from the general separation cycle into the alpha isomer concentration cycle which ultimately yields substantially pure alpha isomer, which is removed from the general purification system in the fourth series of related steps. As previously noted, this solid alpha isomer may be accompanied by solid beta isomer, if sufficient of said beta isomer is present in the starting mixture of isomers introduced into the first series of related steps.

The fresh solvent which is added to supplement the mixture of liquids used for dissolving the wet crystals which form the feed for the fourth series of related steps, is introduced from outside the cycle in an amount which is sufficient to replace the solvent lost or removed at various points from the countercurrent cyclic separation process at equilibrium. Solvent is removed from the cyclic process in the partial evaporation of the mixture of benzene hexachloride isomers and recycled liquor at the start of the first series of related steps. It is also removed from the cycle in the filtrate which is separated at the end of the first series of steps from the crystal cake which forms the feed for the second series of related steps. Some solvent is unavoidably lost with the alpha cake separated from the cycle in the fourth series of steps, and in other miscellaneous mechanical losses.

The following example is given to illustrate how the process may be conducted, but is not to be construed as limiting. For convenience, reference numerals from the drawings have been included in parentheses.

*Example.*—Chlorine (11) and benzene (10) were contacted in an apparatus (12) and manner similar to that described in Patent 2,499,120 of Stormon to prepare 16,800 pounds (2,070 gallons) of chlorinator effluent liquor (13) containing 2283 pounds of alpha, 450 pounds of gamma, 250 pounds of delta, and 377 pounds of beta and epsilon isomers of benzene hexachloride. The mixture was evaporated (14) under reduced pressure until the liquid portion (17) of the resulting slurry contained 62 percent solids at 31 degrees centigrade. The mixture was continuously centrifuged at about 31 degrees centigrade to obtain a filter cake (16) which was washed with benzene and discarded. Said cake (16) was found to contain 2053 pounds of alpha isomer, and 307 pounds of beta and epsilon isomers and substantially no gamma or delta isomer.

The filtrate or mother liquor (17) from the centrifuge was heated to evaporate (18) all remaining benzene (19) and a starting mixture of benzene hexachloride isomers (20) containing 230 pounds of alpha isomer, 450 pounds of gamma isomer, 250 pounds of delta isomer, and 70 pounds of beta and epsilon isomer was obtained. This mixture of isomers (20) was then introduced into a separation cycle maintained in equilibrium.

To the said mixture of benzene hexachloride isomers (20) was added 250 gallons of a supernatant methanol liquor (22) obtained from a subsequent step in the cycle, containing in solution, at 15 degrees centigrade, 48 pounds of alpha, 129 pounds of gamma, 83 pounds delta, and 30 pounds of beta and epsilon isomers. One hundred and twenty-seven gallons of methanol (23) was removed to concentrate the solution to 64 percent solids, the solution was cooled to ten degrees centigrade to induce crystallization and the resulting suspension was filtered. The filtrate (24), which was discarded, consisting of about 109 gallons of solution, contained 61 pounds of alpha, 57 pounds of gamma, 250 pounds of delta, and 70 pounds of beta and epsilon isomers. The filter cake (25) contained 217 pounds of alpha, 522 pounds of gamma, 83 pounds of delta, and 30 pounds of beta and epsilon isomers.

Four hundred gallons of methanolic supernatant liquor (26) from a subsequent step in the cycle was added to the foregoing cake (25). The said supernatant liquor (26) contained, in solution at 30 degrees centigrade, 90 pounds of alpha, 278 pounds of gamma, 50 pounds of delta, and 18 pounds of beta and epsilon isomers. This suspension was heated to about 65 degrees centigrade until complete solution occurred and thereafter cooled, with agitation, to about ten degrees centigrade. Agitation was continued and about 360 gallons of the suspension (28) removed from the zone of crystallization (27) at a rate of about 2 to 3 gallons per minute through a well line nine inches in diameter extending part way to the bottom of the kettle. The wet crystals (32) remaining in the zone of crystallization (27) in the preceding series of steps contained 126 pounds of alpha, 471 pounds of gamma, 18 pounds of delta, and 7 pounds of beta and epsilon isomers. The withdrawn suspension (28) contained 181 pounds of alpha, 329 pounds of gamma, 115 pounds of delta, and 41 pounds of beta and epsilon isomers. This suspension (28) was digested at 15 degrees centigrade and decanted (29) to obtain a clear supernatant liquor (22) and a slurry, also referred to as a precipitate (30). The supernatant liquor (22), having a volume of 250 gallons, contained 48 pounds of alpha, 129 pounds of gamma, 83 pounds of delta, and 30 pounds of beta and epsilon isomers. The slurry (30) had a volume of about 110 gallons and contained 133 pounds of alpha, 200 pounds of gamma, 32 pounds of delta, and 11 pounds of beta and epsilon isomers.

To the wet crystals (32) in the zone of crystallization (27) was added 360 gallons of supernatant liquor (31) from a subsequent step in the process, containing 77 pounds of dissolved alpha, 248 pounds dissolved gamma, 13 pounds of dissolved delta, and 8 pounds of dissolved beta and epsilon isomers at 30 degrees centigrade. The suspension was heated to about 65 degrees centigrade until complete solution was attained, thereafter cooled, with agitation, to about ten degrees centigrade, and 360 gallons of the suspension (33) was removed at the rate of 2 to 3 gallons per minute through the said well line, while agitation was continued. The wet crystals (36) remaining in the zone of crystallization (27) contained 66 pounds of alpha, 495 pounds of gamma, 4 pounds of delta, and 4 pounds of beta and epsilon isomers. The withdrawn suspension (33), containing 137 pounds of alpha, 224 pounds of gamma, 27 pounds of delta, and 11 pounds of beta and epsilon isomers, was added to the slurry (30) from the preceding series of steps (containing 133 pounds of alpha, 200 pounds of gamma, 32 pounds of delta, and 11 pounds of beta and epsilon isomers) and digested at about 30 degrees centigrade, allowed to settle and thereafter decanted (34). The clear supernatant liquor (26) from the decantation (34), amounted to about 400 gallons and contained in solution 90 pounds of alpha, 278 pounds of gamma, 59 pounds of delta, and 18 pounds of beta and epsilon isomers, at 30 degrees centigrade. The slurry (35) had a volume of about 110 gallons and contained 180 pounds of alpha, 146 pounds of gamma, 9 pounds of delta, and 4 pounds of beta and epsilon isomers.

To the said wet crystals (36) remaining in the zone of crystallization (27) was added 130 gallons of supernatant liquor (31) from a subsequent step in the cycle, fifty gallons of filtrate (37) from the next succeeding series of steps, and 180 gallons of methanol (38). The said 130 gallons of supernatant liquor (31) at 30 degrees centigrade contained 28 pounds of dissolved alpha, 87 pounds of dissolved gamma, 5 pounds of dissolved delta, and one pound of dissolved beta and epsilon isomers. The said 50 gallons of filtrate (37) was at a temperature of 10 degrees centigrade and contained 6 pounds of alpha and 20 pounds of gamma isomer. The suspension was heated to about 65 degrees centigrade to obtain complete solution and then cooled to ten degrees centigrade with agitation to cause crystallization. While the agitation was continued, about 50 gallons of settled wet crystals (39) were removed from the zone of crystallization (27). These crystals (39) contained 8 pounds of alpha and 413 pounds of gamma isomer. The suspension (40) remaining in the zone of crystallization (27) was withdrawn therefrom. The withdrawn suspension (40) had a volume of about 425 gallons at 10 degrees centigrade and contained 92 pounds of alpha, 189 pounds of gamma, 9 pounds of delta, and 5 pounds of beta and epsilon isomers. This suspension (40) was combined with the 110 gallons of slurry (35) from the preceding series of steps, containing 180 pounds of alpha, 146 pounds of gamma, 9 pounds of delta, and 4 pounds of beta and epsilon isomers. This mixture was heated to about thirty degrees centigrade and centrifuged (41) at this temperature. The filter cake (42) containing about 167 pounds of alpha isomer, was removed from the separation cycle. The filtrate (31) amounted to 490 gallons at 30 degrees centigrade and contained 105 pounds of alpha, 335 pounds of gamma, 18 pounds of delta, and 9 pounds of beta and epsilon isomers. This filtrate (31) was recycled in two portions as has previously been described.

The withdrawn settled wet crystals (39) from the preceding step, containing about 413 pounds of gamma and 8 pounds of alpha isomer, were dissolved (44) in about 225 gallons of methanol (43) at about sixty degrees centigrade. Ten pounds of activated carbon (45) were then added to remove coloration and the mixture filtered (46) while hot. The carbon cake (47) was discarded. The filtrate (48) was concentrated to about fifty percent of its original volume, cooled (49) to about ten degrees centigrade, and filtered to obtain a cake (50) of 393 pounds of gamma isomer having a purity of above 99 percent. The filtrate (37), amounting to about 50 gallons, contained 6 pounds of dissolved alpha isomer and 20 pounds of dissolved gamma isomer at 10 degrees centigrade. This filtrate (37) was recycled in the process as previously described.

The following table gives the commonly accepted solubility data for each of the known isomers of benzene hexachloride in various solvents.

Table

SOLUBILITY OF ISOMERS IN GRAMS PER 100 GRAMS OF SOLVENT AT 20° C.

| | Alpha | Beta | Gamma | Delta | Epsilon |
| --- | --- | --- | --- | --- | --- |
| Methanol | 2.3 | 0.2 | 8.0 | 27.3 | 3.7 |
| Ethanol | 2.5 | 0.93 | 6.7 | 31.2 | 4.2 |
| Benzene | 11.3 | 1.12 | 33.7 | 46.2 | 14.8 |
| Toluene | 9.0 | 2.1 | 27.6 | 41.6 | 15.8 |
| Ethylacetate | 12.5 | 5.9 | 46.3 | 75.5 | 24.5 |
| Propylene dichloride | 7.1 | 0.32 | 20.0 | 22.2 | 3.3 |
| Monochlorobenzene | 7.4 | 0.4 | 23.4 | 21.4 | |
| Ethyl ether | 5.6 | 0.36 | 19.2 | 31.0 | 3.0 |
| Acetone | 14.1 | 7.9 | 56.0 | 85.0 | 33.2 |
| Acetic acid, glacial | 4.2 | 1.0 | 12.8 | 25.6 | |

In a manner after the foregoing description example and with modifications in conditions of temperature and volumes of solvent employed, according to the differences in solubility between solvents as depicted in Table I, the organic solvents in the table, which are illustrative of alcohols, aromatic hydrocarbons, esters, halogenated organic compounds, ketones, acids and ethers, can be used in accordance with this invention. It is to be understood, however, that this invention is not to be construed as limited thereto except as defined in the appended claims.

I claim:

1. The process for separating the alpha and gamma isomers of benzene hexachloride, involving a series of alpha isomer and of gamma isomer-enrichment steps in which the feed for the series of alpha isomer-enrichment steps is derived from the series of gamma isomer-enrichment steps and a solvent liquor for the gamma isomer-enrichment steps is derived from the series of alpha isomer-enrichment steps, which includes: (1) dissolving a crystal cake of isomers of benzene hexachloride containing at least the alpha and gamma isomers in a second liquor obtained from a second alpha isomer-enrichment step in the process; (2) effecting crystallization of at least alpha and gamma isomers from the solution so produced; (3) separating the so-obtained crystals by fluid classification to yield a first fraction of crystals in which the ratio of gamma isomer to alpha isomer is enhanced and a first suspension of crystals in which the ratio of alpha isomer to gamma isomer is enhanced; (4) recovering from the said first suspension of crystals a first liquor used in the preparation of the crystal cake of isomers for step (1) and a first precipitate containing alpha-isomer-enhanced crystals; (5) dissolving the said gamma-isomer-enhanced first fraction of crystals in a third liquor obtained from a third alpha isomer-enrichment step in the process; (6) effecting crystallization of at least alpha and gamma isomers from the solution so produced; (7) separating the so-obtained crystals by fluid classification to yield a second fraction of crystals in which the ratio of gamma isomer to alpha isomer is enhanced and a second suspension of crystals in which the ratio of alpha isomer to gamma isomer is enhanced; (8) combining said second alpha-enhanced-suspension of crystals and the first alpha-enhanced-precipitate recovered from the said first suspension of crystals; (9) recovering from said combined second suspension and first precipitate the said second liquor used in step (1) of the process and a second precipitate containing a higher ratio of alpha isomer to gamma isomer than the ratio of the said precipitate; and, (10) continuing the process to produce substantially pure gamma isomer.

2. The process for separating the alpha and gamma isomers of benzene hexachloride, involving a series of alpha isomer and of gamma isomer-enrichment steps in which the feed for the series of alpha isomer-enrichment steps is derived from the series of gamma isomer-enrichment steps and a solvent liquor for the gamma isomer-enrichment steps is derived from the series of alpha isomer-enrichment steps, and in which fluid classification is employed in the separation of alpha and gamma isomer crystals, which includes: dissolving a mixture of isomers of benzene hexachloride containing at least alpha, gamma, and delta isomers in a liquor obtained from a first alpha isomer-enrichment step in the process; crystallizing from such solution a mixture of isomers of diminished delta isomer and enhanced alpha isomer and gamma isomer content; recovering the crystals by filtration for further treatment to effect separation of the alpha isomer and gamma isomer content thereof; and, withdrawing the filtrate from the process whereby the dissolved quantity of delta isomer circulating in the process enrichment steps is maintained substantially constant.

3. The process for separating the alpha and gamma isomers of benzene hexachloride, involving a series of alpha isomer and of gamma isomer-enrichment steps in which the feed for the series of alpha isomer-enrichment steps is derived from the series of gamma isomer-enrichment steps and a solvent liquor for the gamma isomer-enrichment steps is derived from the series of alpha isomer-enrichment steps, which includes: dissolving a mixture of at least the alpha and gamma isomers of benzene hexachloride in a liquor obtained from a second alpha-isomer enrichment step in the process; effecting crystallization of at least alpha and gamma isomers from the solution so-produced; separating the so-obtained crystals by fluid classification to yield a first suspension of crystals in which the ratio of alpha isomer to gamma isomer is enhanced; heating said first suspension of crystals to a temperature between about 5 and about 50 centigrade degrees above the temperature at which the fluid classification step was conducted; settling the suspension while at said elevated temperature; and, decanting the supernatant liquor.

References Cited in the file of this patent

UNITED STATES PATENTS

| 2,486,688 | Thomas et al. | Nov. 1, 1949 |
| 2,529,803 | Gonze | Nov. 14, 1950 |
| 2,573,676 | Campbell | Nov. 1, 1951 |
| 2,585,898 | Kauer | Feb. 12, 1952 |
| 2,699,456 | Kimball et al. | Jan. 11, 1955 |

FOREIGN PATENTS

| 491,132 | Belgium | Mar. 16, 1950 |

OTHER REFERENCES

Perry: "Chemical Engineers Handbook," Third Edition, pp. 922–930 (1950).